(12) United States Patent
Koch et al.

(10) Patent No.: US 7,383,316 B2
(45) Date of Patent: Jun. 3, 2008

(54) SYSTEM AND METHOD FOR PROVIDING DYNAMIC LOCATION INFORMATION

(75) Inventors: Zeke Koch, Seattle, WA (US); David Edward Stewart, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 638 days.

(21) Appl. No.: 10/295,303

(22) Filed: Nov. 15, 2002

(65) Prior Publication Data

US 2004/0098464 A1  May 20, 2004

(51) Int. Cl.
*G06F 15/16* (2006.01)
(52) U.S. Cl. ............................. 709/217; 709/217
(58) Field of Classification Search ........ 709/227–229, 709/230, 217
See application file for complete search history.

(56) References Cited

U.S. PATENT DOCUMENTS

| | | | |
|---|---|---|---|
| 6,023,232 A | 2/2000 | Eitzenberger | 340/988 |
| 6,480,146 B1* | 11/2002 | Ferrandis et al. | 342/357.06 |
| 2001/0047407 A1 | 11/2001 | Moore et al. | 709/223 |
| 2002/0156917 A1* | 10/2002 | Nye | 709/238 |
| 2002/0188689 A1* | 12/2002 | Michael | 709/206 |
| 2002/0198824 A1* | 12/2002 | Cook | 705/38 |
| 2003/0003988 A1* | 1/2003 | Walker et al. | 463/21 |
| 2003/0222005 A1* | 12/2003 | Polizzotto et al. | 210/143 |

FOREIGN PATENT DOCUMENTS

WO  WO 01/33825 A1  5/2001

OTHER PUBLICATIONS

Supporting location-Awareness in open Distributed Systems, Ulf Leonhardt, Imperial college of Science, Technology and Medicin,University of London, May 1998.*

Hideki Shimada et al., "Evaluation of a Location Management System for Wireless Communicating Mobile Computers," *Springer-Verlag*, 2002 (13 pages).

Gurushyam Hariharan et al., "Location-based Retrieval Framework," *SPIE*, 2003 (11 pages).

Yongbo Niu et al., Enabling Web-Based Location-Dependent Information Services in Mobile Environments, *Springer-Verlag*, 2003 (7 pages).

Jivodar B. Tchakarov et al., "Efficient Content Location in Wireless Ad Hoc Networks," *IEEE*, 2004 (14 pages).

* cited by examiner

*Primary Examiner*—Jason Cardone
*Assistant Examiner*—Mitra Kianersi
(74) *Attorney, Agent, or Firm*—Merchant & Gould P.C.; Ryan T. Grace

(57) ABSTRACT

A system and method for providing the dynamic geographic location of a computing device to location aware applications. This system and method enables the location aware applications to enhance the user experience by taking the dynamic geographic location of a user into account in its operations. Location providers associated with the computing device provide dynamic geographic data associated with the geographic location of the user. The dynamic geographic data is converted to a common format that is recognized by the location aware applications. The location aware applications incorporate the dynamic location in presenting information to the user.

33 Claims, 8 Drawing Sheets

SYSTEM AND METHOD FOR PROVIDING DYNAMIC LOCATION INFORMATION

BACKGROUND OF THE INVENTION

Today's computing devices can perform more tasks than ever before. Manufactures and software developers continue to find new uses for computing devices. For example, with the proper hardware and software components, a computing device can serve as a communication device for communicating with friends and family. A popular type of communication application is instant messaging (IM). A local user may log on to an IM server using an appropriate application. Once the local user is logged on to the IM server, the local user may communicate with remote users located at different geographic locations. IM has been popular among users of desktop computing devices for some time now. Recently, IM has also become increasingly popular among users of mobile computing devices.

In conventional IM systems, a local user can usually determine whether a remote user is available for communication or chatting. Some IM systems also allow the local user to enter a particular profile for viewing by remote users. However, the user-entered profiles are static in nature and could not be updated automatically. Thus, although IM allows users to communicate with one another, the user experience is somewhat limited in scope.

SUMMARY OF THE INVENTION

Briefly stated, the present invention is directed at a system and method for providing the dynamic geographic location of a computing device to an application. This system and method enables the application to enhance the user experience by taking the computing device's geographic location into account in its operations. Location providers associated with the computing device provide dynamic geographic data associated with the geographic location of the user. The dynamic geographic data are converted to a common format that is recognized by applications executing on the computer device. The application incorporates the dynamic geographic data in presenting information to the user.

In one embodiment, the present invention is directed at a computer-implemented method for an instant messaging application to present location information to the user. The method determines a remote party that is capable of exchanging instant messages with the user and receives geographic data associated with the remote party. The method also determines geographic data associated with the user. Based on the geographic data associated with the remote party and the user, the method presents location information about the remote party to the user.

In another aspect, the computing device is directed at a computing device for providing information to a user. The computing device includes a processor, a location provider, a network interface for data communication through a network, and a memory into which computer executable components are loaded. The computer executable components includes a computer executable component that is configured to presenting location information to the user based on geographic data associated with a remote party and the user.

DETAILED DESCRIPTION OF THE PREFERRED EMBODIMENT

The inventors of the present invention have appreciated that a variety of applications can benefit from knowing the dynamically updated geographic locations of computing devices that are in communication with each other. Thus, the present invention focuses on presenting dynamic location information to the user. In one embodiment, the present invention provides dynamic geographic data to an instant messaging application. Using the dynamic geographic data, the instant messaging application presents to a user location information related to the relative geographic locations of remote parties with whom the user may exchange data messages. The dynamic geographic data may be provided to the instant messaging application along with accuracy information related to the accuracy of the dynamic geographic data. The accuracy information allows the instant messaging application to present the location information to the user in a meaningful manner. These and other aspects of the invention will become apparent after reading the following detailed description.

Figure 1:
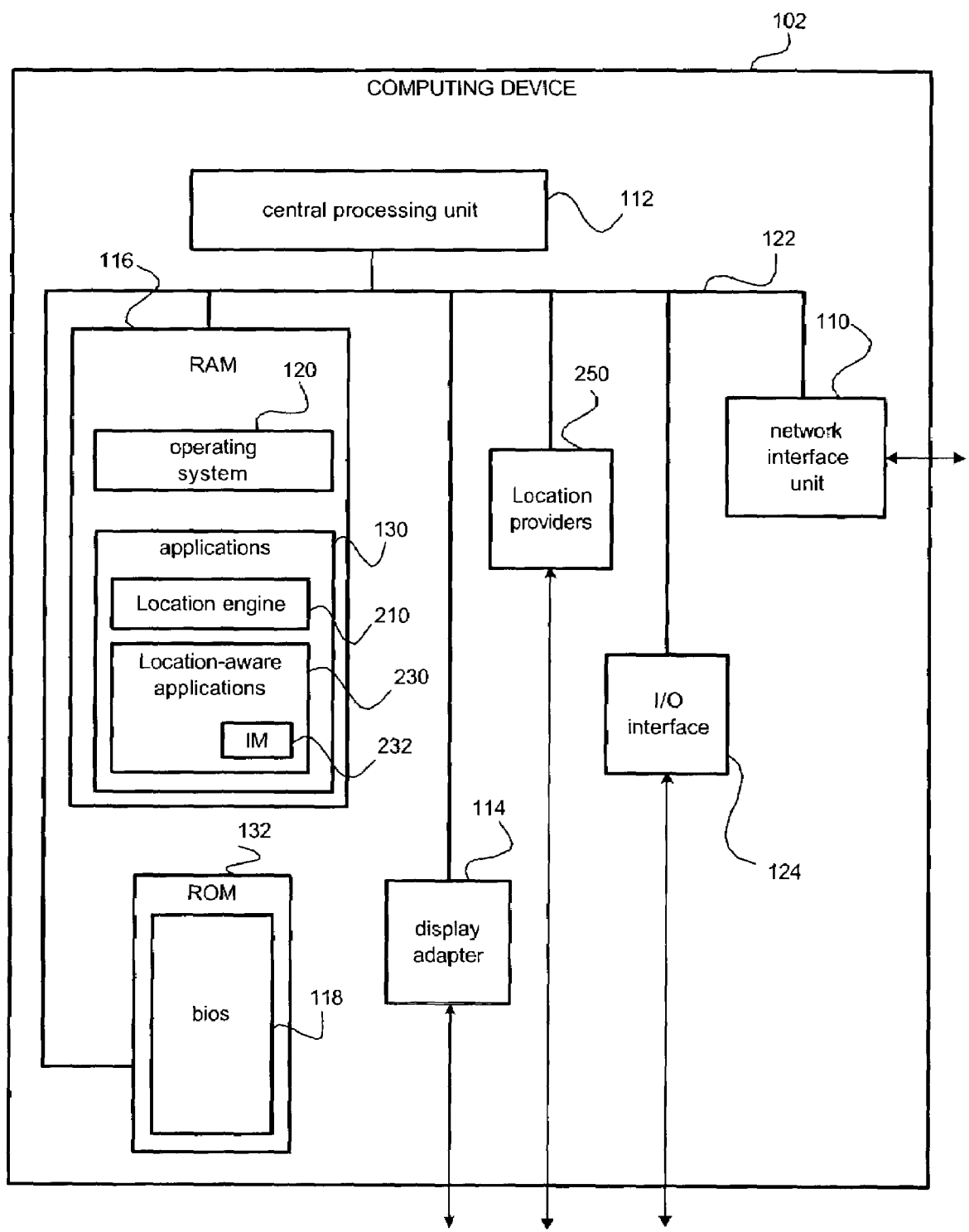
FIG. 1 is an exemplary computing device that may be included in a system implementing this invention.

FIG. 1 and the following discussion are intended to provide a brief general description of a suitable computing environment in which the invention may be implemented. Although not required, this invention will be described in the general context of computer-executable instructions, such as program modules, being executed by a computing device. Generally, program modules include routines, programs, objects, components, data structures and the like that perform particular tasks or implement particular abstract data types.

Moreover, those skilled in the art will appreciate that this invention may be practiced with a variety of computer system configurations, including mobile computing devices, personal computers, wireless mobile phones, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 is an exemplary computing device 102 that may be included in a system implementing this invention, according to one embodiment of the invention. In other configurations, computing device 102 may include many more components than those shown. Computing device 102 may include processing unit 112, display adapter 114, location providers 250, network interface unit 110, mass memory, all in communication with each other via bus 122. The mass memory may include RAM 116, ROM 132, and one or more permanent mass storage devices. The mass memory stores operating system 120 for controlling the operation of computing device 102. A general-purpose operating system may be employed. Basic input/output system ("BIOS") 118 is also provided for controlling the low-level operation of computing device 102.

Location providers 250 are electronic components that are configured to obtain dynamic geographic data related to the dynamically updated geographic location of computing device 102. Location providers 250 may be completely or partially incorporated into computing device 102. Location providers 250 may provide the dynamic geographic data to application executing in computing device 102 by interacting with location engine 210.

As illustrated in FIG. 1, computing device 102 may include network interface 110 for connecting to one or more networks such as a wireless mobile phone network, a local area network (LAN), a wide area network (WAN), such as the Internet, or any other network. Network interface 110 may be constructed for use with various communication protocols. Communication media between computing device 102 and a network typically embodies computing readable instructions, program modules or other data in a modulated data signal such as a carrier wave or other transport mechanism and includes any information delivery media. The term "modulated signal" means a signal that has one or more of its characteristics set or changed in such a manner as to encode information in the signal. By way of example, not limitation, communication media includes wired media such as a wired network or direct-wired connection, and wireless media such as acoustic, RF, infrared and other wireless media. Combinations of any of the above should also be included within the scope of computing device readable media. Computing device 102 also includes input/output interface 124 for communicating with external devices, such as a touch-screen, keypad, keyboard, mouse, scanner, or other input devices not shown in FIG. 1.

The mass memory as described above illustrates another type of computing-readable media, namely computing device storage media. Computing-readable storage media may include volatile and nonvolatile, removable and non-removable media implemented in any method or technology for storage of information, such as computing device readable instructions, data structures, program modules, or other data. Examples of computing device storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may store program code and data for computing applications 130, such as location engine 210 and location-aware applications 230. Location engine 210, location-aware applications 230, and related components will be described in detail in conjunction with FIG. 2. Briefly stated, location engine 210 provides dynamic geographic data to applications executing on computing device 102. Location-aware applications 230 are applications that are capable of incorporating dynamic geographic data into their operations. As shown in the figure, the location-aware applications 230 may include instant messaging application 232.

Figure 2:
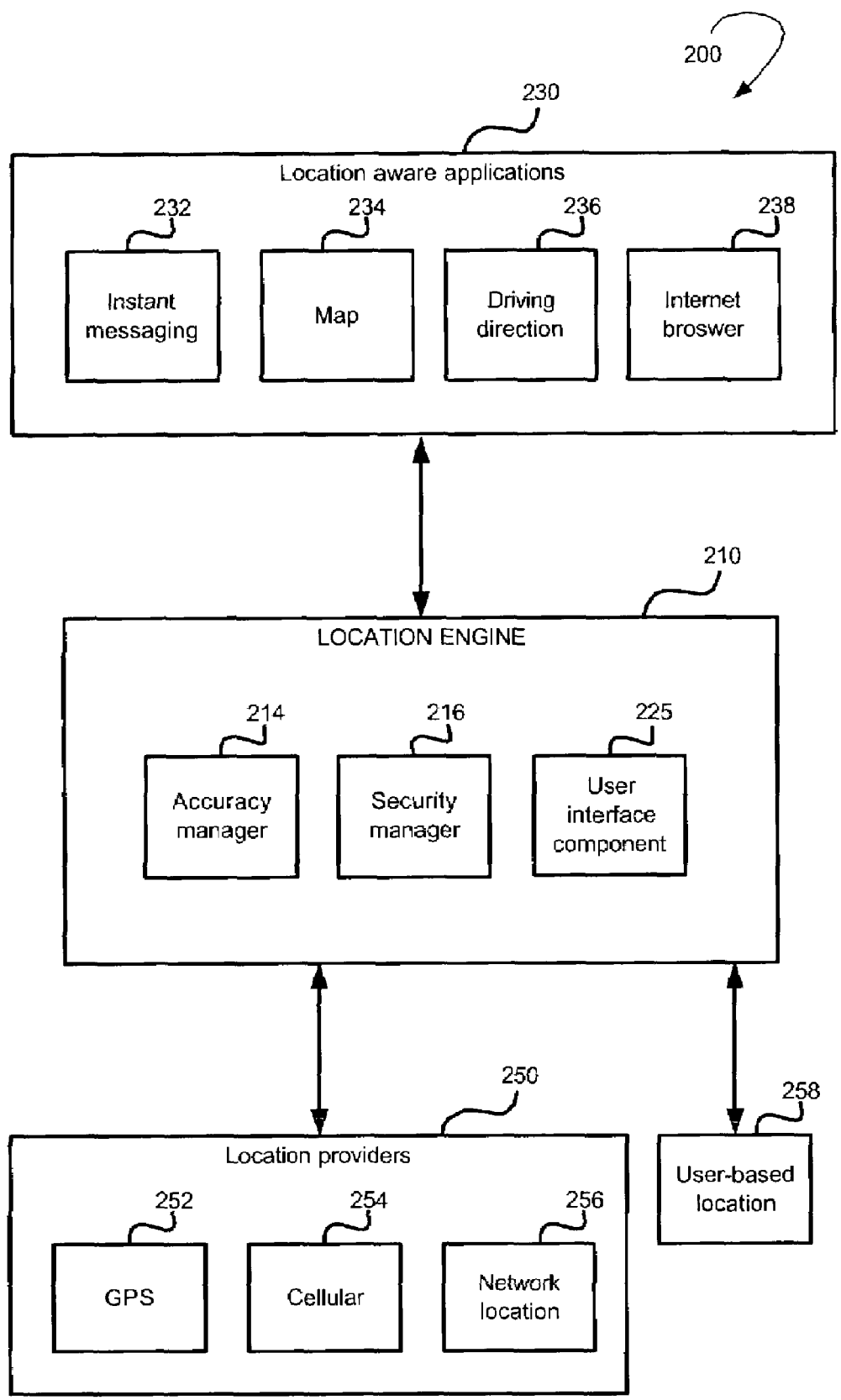
FIG. 2 is a functional block diagram illustrating components of a location providing system in which the present invention may be implemented.

FIG. 2 is a functional block diagram illustrating components of a location providing system 200 in which the present invention may be implemented. Location providing system 200 is part of a computing device that may be a personal computer, mobile communication device, or the like. Shown in FIG. 2 is location engine 210, which may interact with location-aware applications 230 and location providers 250. In operation, location engine 210 obtains dynamic geographic data and other related data from location provider 250 and provides the dynamic geographic data and the related data to location aware applications 230.

Location engine 210 is a computer-executable component configured to provide dynamic geographic data to applications executing in a computer device. In one aspect, location engine 210 may be configured to function as a common application user interface that serves as an intermediary between location-aware applications and location providers 250. With location engine 210 so configured, location-aware applications 230 are not required to have knowledge of any of the location providers 250 in order to obtain and use the dynamic geographic data. As shown in the figure, location engine 210 may include accuracy manager 214, security manager 216, and user interface component 225.

User interface component 225 enables location engine 210 to interact with users. In particular, user interface component 225 provides a user interface for a user to control various aspects of location engine 210. An exemplary screenshot of the user interface provided by location engine 210 will be shown in FIG. 3.

Accuracy manager 214 is a component of location engine 210 that determines the accuracy associated with the dynamic geographic data provided by location providers 250. Accuracy manager 214 may determine the accuracy in a variety of ways. For example, location providers 250 may simply provide the accuracy along with the dynamic geographic data. If the accuracy is not provided along with the dynamic geographic data, accuracy manager 214 may calculate the accuracy with data from other sources or obtain the accuracy from user input.

Security manager 216 is a component of location engine 210 that controls certain operations of location engine 210 to obtain a desire level of security. For example, security manager 216 may require authorization from the user before sending dynamic geographic data to location aware applications 230. Security manager 216 may enable the user to set a different level of security for each of the location aware applications 230. It is to be understood that the security measures taken by security manager 216 are independent of security measures provided by location aware applications 230.

Location providers 250 are components of location providing system 200 that are configured to provide dynamic geographic data for applications executing in the computing device. Each of the location providers 250 may obtain the dynamic geographic data using a different mechanism. Location provides 250 may be external devices that are electronically connected to the computing device. Location providers 250 may also be implemented as components within the computing device.

As shown in FIG. 2, location providers 250 may include Global Position System (GPS) device 252 that obtains dynamic geographic data from analyzing signals from GPS satellites. Location providers 250 may also include cellular device 254 that obtains dynamic geographic data from a wireless carrier. Network location device 256 that obtains dynamic geographic data by analyzing network related data may also be included. In addition to dynamic geographic data, location providers 250 may also provide the accuracy associated with the dynamic geographic data.

As a default method, a user-based location component 258 may be used where the user inputs static geographic data. The user may enter the static geographic data in a variety of ways, such as picking a location from a map, providing an address, geographic coordinates, telephone number, and the like.

Location-aware applications 230 are configured to incorporate, dynamic geographic data into the applications' operations for enhancing the user experience. In this regard, location-aware applications 230 are configured to receive dynamic geographic data related to the geographic location of the computing device from location engine 210. Location-aware applications 230 are also configured to obtain geographic data related to the geographic locations of remote devices that are in communication with the computing device. As shown in the figure, location-aware application 230 may include instant messaging application 232, map application 234, driving direction application 236, internet browser application 238, and the like.

Internet browser application 238 is an application that enables a user to browser websites on the Internet. Using dynamic geographic data received from location engine 210, Internet browser application 238 may take the user's location into account in configuring the websites for displaying to and use by the user. For example, Internet browser 238 may select content of the website, populate input fields, or perform other actions based on the dynamic geographic data.

Map application 234 is an application that provides a map associated with a particular geographic location. Typically, a user may select the scale associated with the map (e.g. zoom-in, zoom-out). Map application 234 may be configured to display a map associated with the dynamic geographic data provided by location engine 210 or one of the location-aware applications. Map application 234 may also display the map with a scale that is meaningful to the user by taking the accuracy associated with the dynamic geographic data into account. For example, map application 234 may select a scale that is of the same order of magnitude as the accuracy of the dynamic geographic data.

Driving direction application 226 is an application that provides instructions for traveling from one specified location to another specified location. The instructions are typically presented in a table showing one or more legs of travel along with the distance of each leg. The instructions may also include in a map for illustration. Driving direction application 226 is configured to use dynamic geographic data for presenting the instructions to the user. For example, driving direction application 226 may receive dynamic geographic data associated with two locations. One of the locations may be associated with the user while the other location may be associated with a remote party with which the user is in communication. Driving direction application 226 may be configured to provide instructions for traveling between the user and the remote party. Driving direction application 226 may also be configured to provide the instructions in a meaningful manner based on the accuracy associated with the dynamic geographic data.

Instant messaging application 232 is an application that allows a user to interactively communicate with remote parties in a communication network using non-voice data messages. Instant messaging application 232 may be used for communication among personal computers, mobile communication devices, and other devices that are capable of connecting to a network on which non-voice data messages may be sent and received.

Instant messaging application 232 is configured to obtain dynamic geographic data and, if selected by the user, to incorporate the geographic data in presenting to the user location information of remote parties with whom the user is exchanging non-voice data messages. In one embodiment of the invention, instant messaging application 232 is configured to send dynamic geographic data of the user to the remote parties. Instant messaging application 232 may also be configured to determine geographic data of a remote party, to calculate the distance between the user and a remote party, and to display the calculated distance to the user. Instant messaging application 232 may select a display format for displaying the calculated distance based on the accuracy of the geographic data associated with the user and the remote party.

Instant messaging application 232 may be further configured to implement security measures that are selected by the user. For example, the user may select to send geographic data only to certain remote parties that are connected to the instant messaging network. These measures may be in addition to those implemented by the location engine 210.

Figure 3:
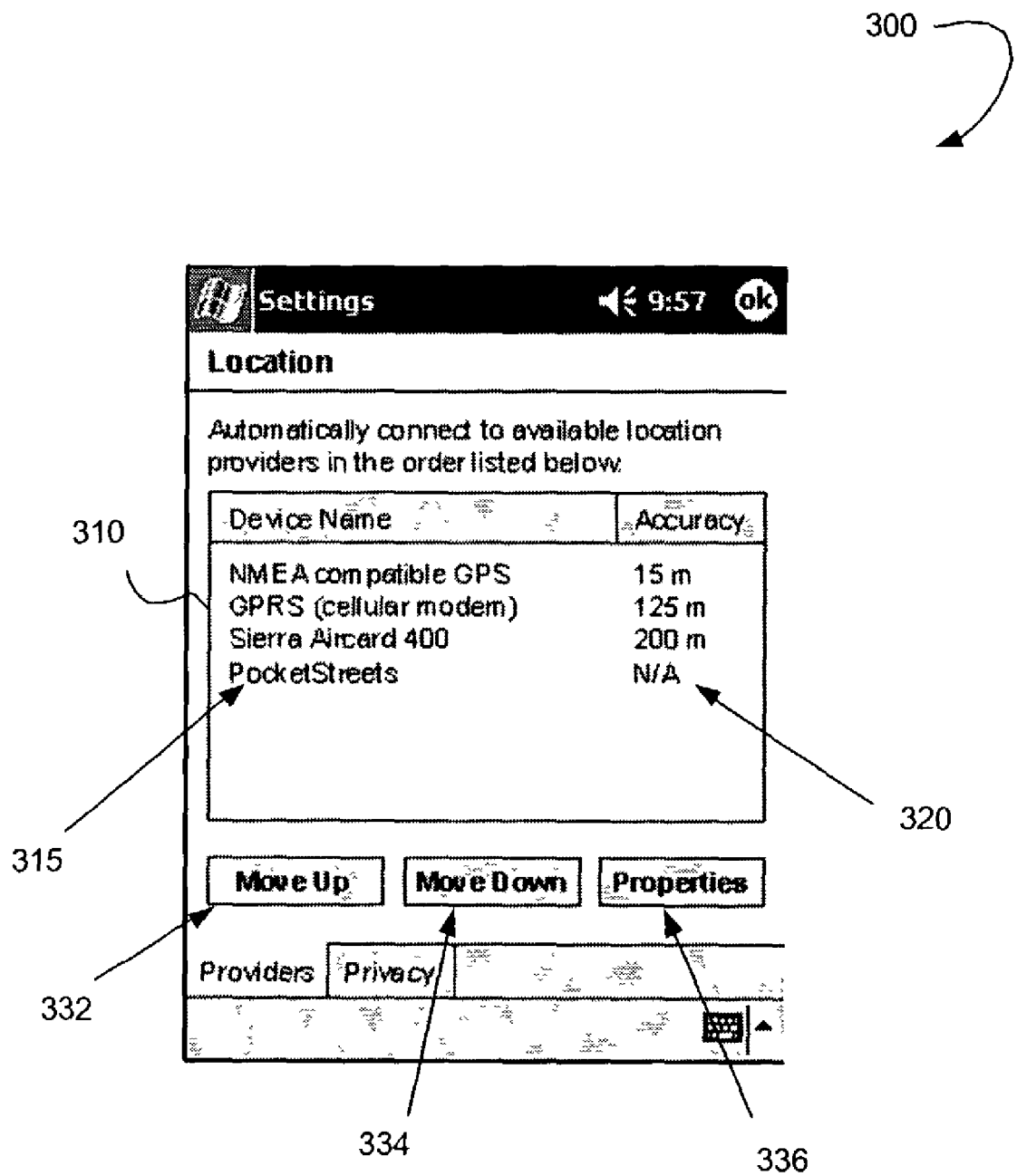
FIG. 3 is an exemplary screenshot of a user interface for interacting with location providers associated with a location engine.

FIG. 3 is an exemplary screenshot of a user interface 300 for interacting with location providers associated with a location engine. As shown in the figure, user interface 300 includes a device display area 310. Information about the location providers is displayed in two columns in device display area 310. Device information column 315 shows the names of location providers that may be available to provide geographic data to the location engine. The accuracy of each of the location providers displayed in the device information column 315 is displayed in accuracy information column 320.

User interface 300 also enables a user to set a priority associated with the location providers. According to the priority, the location engine may determine from which location provider it should obtain geographic data. The user may select a particular location provider on device display area 310. Then, the user may active the move-up trigger 332 or a move-down trigger 334 to modify the priority of the selected location provider.

User interface 300 also enables a user to control other properties associated the location providers. For example, the user may modify the accuracy, the security settings, and other properties associated with a particular location provider. The user may select the properties window trigger 336 to display a window with controls for modifying the properties of the currently selected location provider.

Figure 4:
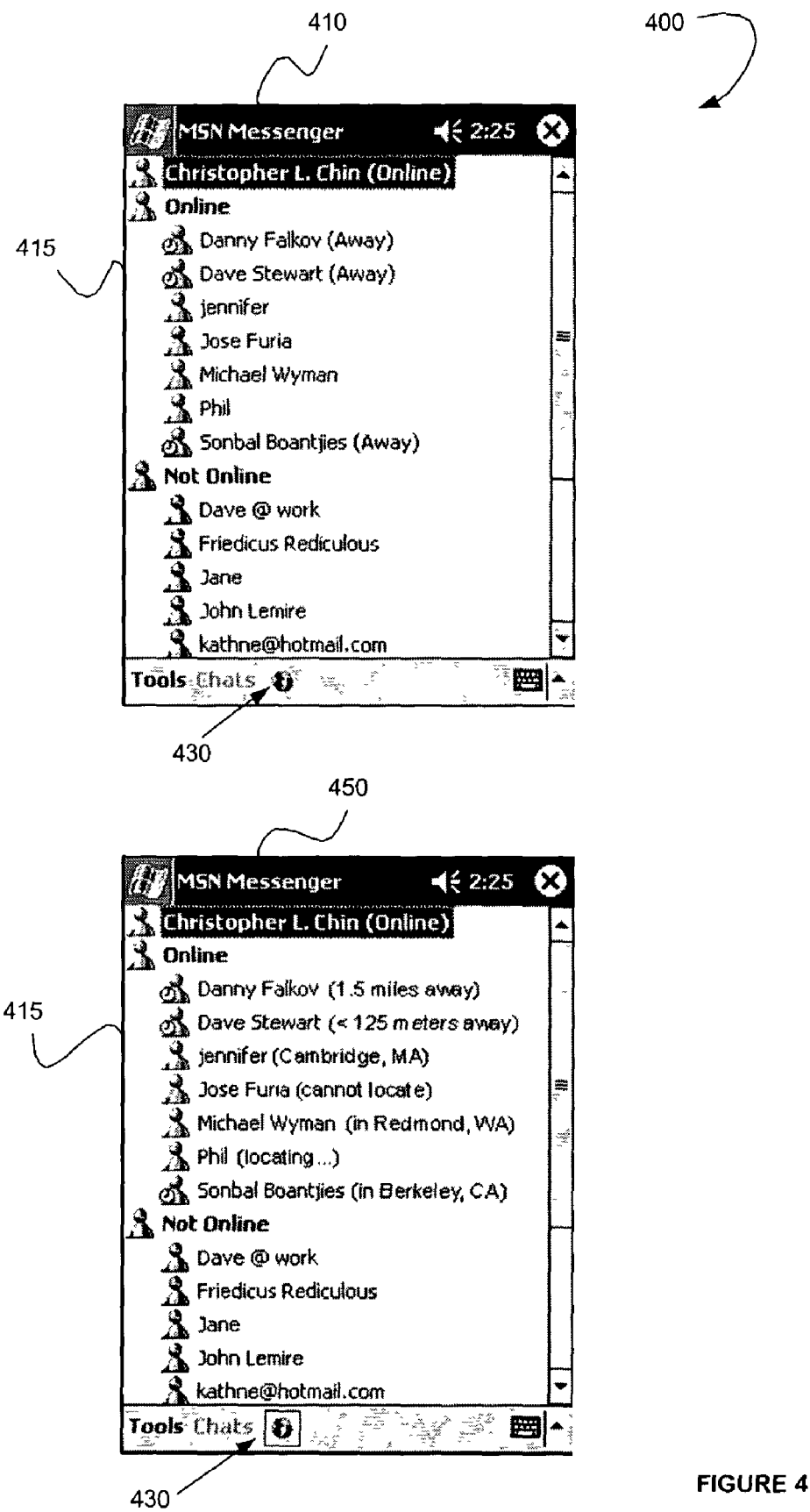
FIG. 4 illustrates two exemplary screenshots of a user interface associated with an instant messaging application.

FIG. 4 illustrates two exemplary screenshots of a user interface 400 associated with an instant messaging application. The instant messaging application is executing on a computing device that is connected to a network. A user of the computing device may use the instant messaging application to exchange data messages with remote parties through the network. For example, the computing device may interact with a server on the network that provides instant messaging services. The user may log on the server and exchange data messages with remote parties who are also logged on to the server.

As illustrated in screenshot 410, user interface 400 includes a user display area 415 for displaying the names of the user and remote parties with whom the user could exchange data messages. The user may configure the instant messaging application so that only remote parties with whom the user is interested in exchanging data messages are displayed. In the user display area 415, the user's name is displayed with a status indicator in parenthesis that shows status of the user (e.g. available or not available to exchange data messages).

The names of the remote parties are grouped according to whether they are online or not. For remote parties who are online, each of their names may be displayed with location information. Location information may include geographic data, distance from the user, and the like. The user interface 400 may be configured to offer the user a selection whether to display the location information. In screenshot 410, location information is not displayed. The user may select the option to display the location information by activating the location information display trigger 430.

Screenshot 450 shows user display area 415 when the location information display trigger 430 is activated. As shown in screenshot 450, location information is displayed in parenthesis next to names of the remote parties that are online. In one embodiment, the location information of a particular party being displayed is the distance between the user and the party. The distance may be calculated based on the user's and the party's geographic locations. To enhance usability, the display format of location information associated with a particular remote party may be based on the calculated distance between the user and the remote party and the accuracy associated with geographic data associated with the user and the remote party. For example, if the calculated distance is more than the diameter of the user's city, the location information may be displayed as the city and state of where the remote party is located. On the other hand, if the calculated distance is less than the accuracy associated with the geographic data of either the user or the remote party, the distance may simply be displayed as less than the accuracy.

Figure 5:
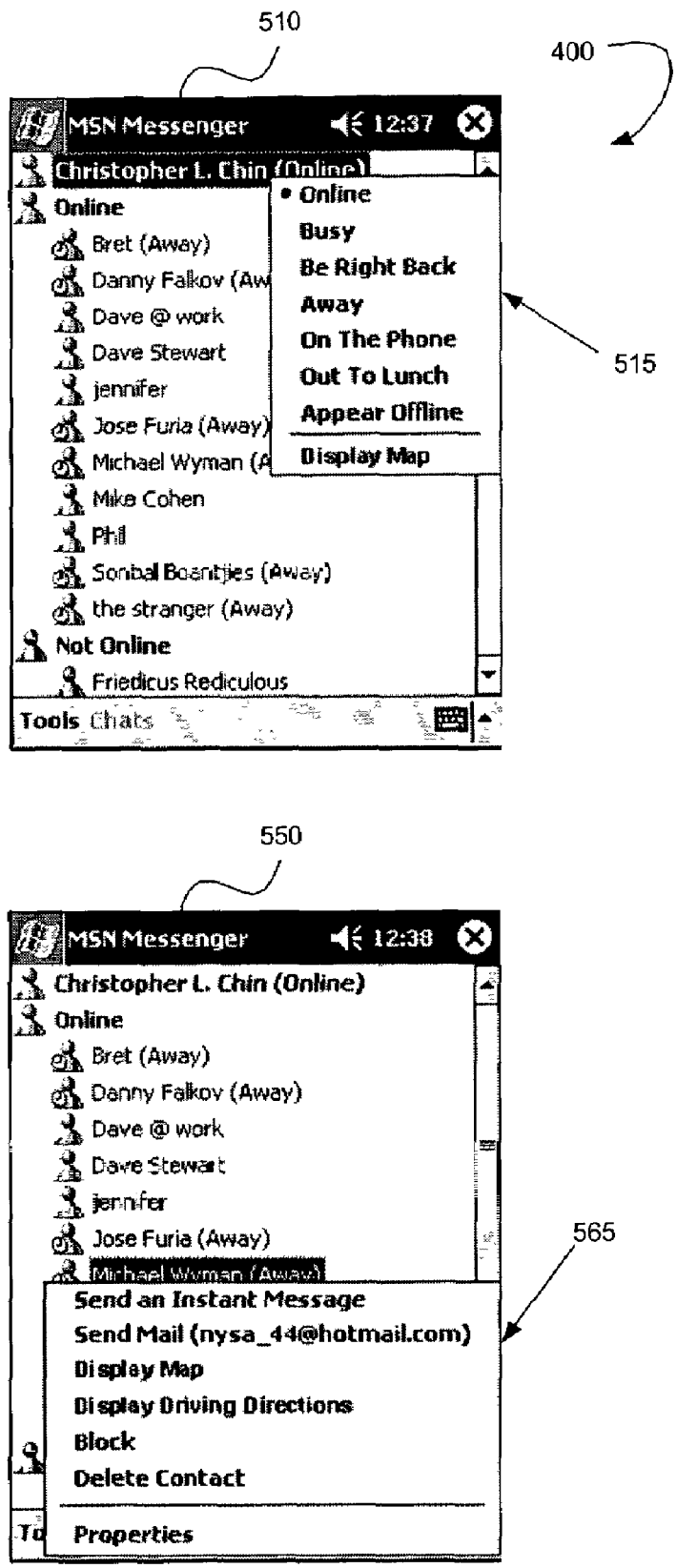
FIG. 5 illustrates another two exemplary screenshots of the user interface shown in FIG. 4.

FIG. 5 illustrates another two exemplary screenshots of the user interface 400 shown in FIG. 4. User interface 400 is now configured to enable the user to select various options of the instant messaging application. As shown in screenshot 510, user interface 400 displays the names of the user, online remote parties, and offline remote parties associated with a instant messaging server. Each of the names may be selected. When the name of the user is selected, a user option menu 515 may appear. User option menu 515 may enable the user to select how a status indicator next to the user's name is displayed. For example, the user may select to display the user's status as online, busy, be right back, away, on the phone, out to lunch, offline, and the like.

User option menu 515 may also include an option for displaying a map that indicates the user's current geographic location. Selecting this option causes a map application to display a map that indicates the geographic location indicated by the geographic data associated with the user. The map application may also select a scale based on the accuracy associated with the geographic data.

As shown in screenshot 550, when the name of one of the other parties is selected, a party option menu 555 may appear. Party option menu 555 enables the user to select different options related to communicating with and obtaining information about a particular remote party. For example, the party option menu 555 may allow the user to select an option to send an instant data message or a conventional email to the remote party.

Party option menu 555 may also allow the user to select an option to display a map that depicts the remote party's geographic location or driving directions for traveling between the user's geographic location and the party's geographic location. Both the map and the driving directions may be created based on geographic data associated with the user and the remote party. Other options, such as displaying driving directions, blocking the user's geographic data from being sent to remote parties, and removing the remote party from the user interface are also available.

Figure 6:
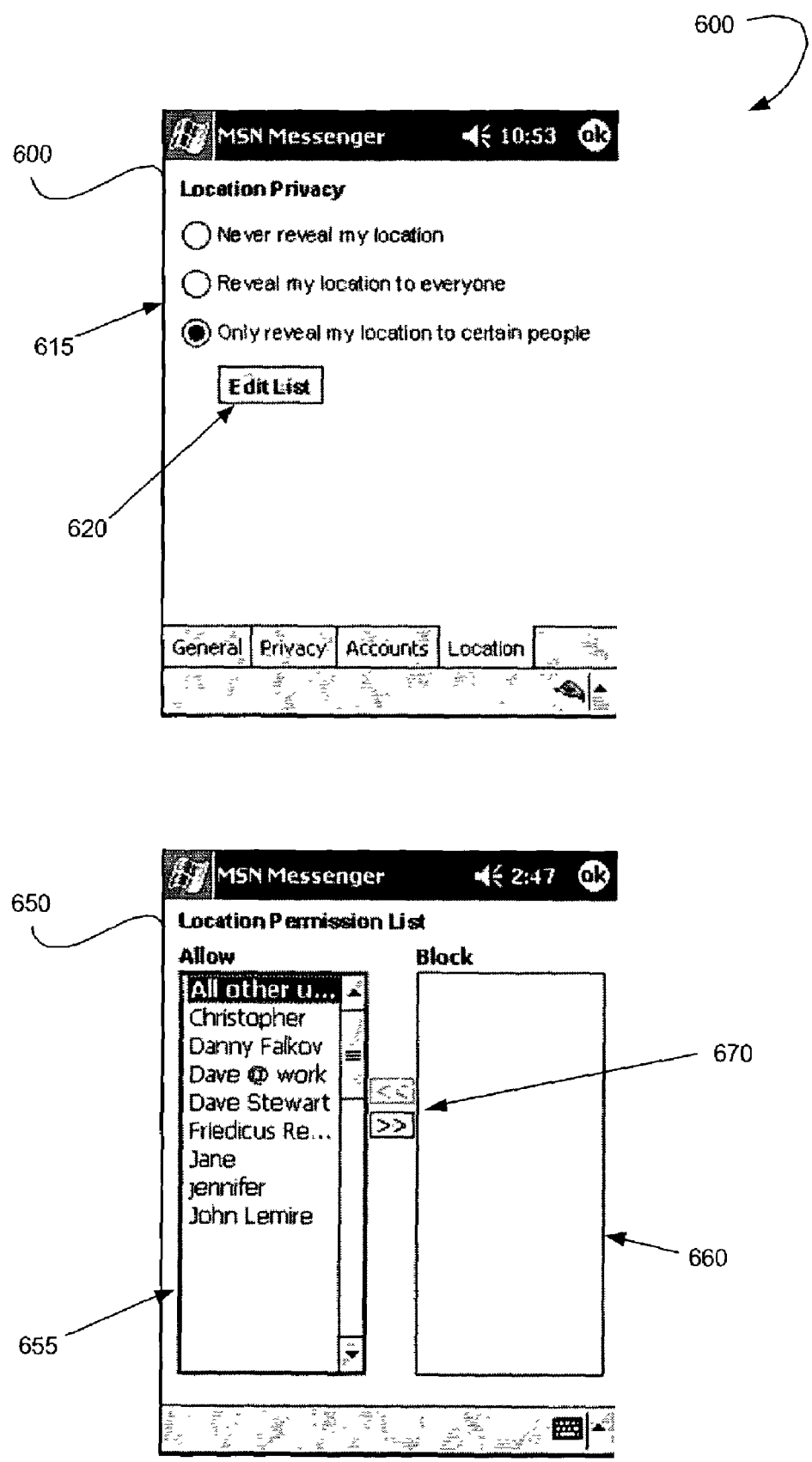
FIG. 6 illustrates yet another two exemplary screenshots of the user interface shown in FIG. 4.

FIG. 6 illustrates two exemplary screenshots of another user interface 600 associated with an instant messaging application. User interface 600 enables a user of the instant messaging application to control the security level related to the sending of geographic data to remote parties. Screen shot 610 illustrates exemplary privacy levels that are available to the user. By selecting one of the radio buttons 615, the user may choose to never send the user's geographic location, to send the user's geographic location to all of the remote parties, or to only send the user's geographic location to certain remote parties selected by the user. The user may select the remote parties to whom to send the user's geographic location by activating the permission list trigger 620.

When permission list trigger 620 is activated, a new screen with a different layout appears, as shown in screenshot 650. This layout shows a location permission list. The location permission list includes allowed party box 655 and blocked party box 660. These boxes may include names of remote parties to whom the user can exchange instant messages. The boxes may also be restricted to include only names of remote parties with whom the user has selected to exchange instant messages.

The names of remote parties may appear in either allowed party box 655 or blocked party box 660. The user may allow the user's geographic data be sent to a particular remote party by moving the name of the remote party in allowed party box 655. The user may prohibit the user's location information be sent to a remote party by moving the name of the remote party in the blocked party box 660. The user may move the names of remote parties between the boxes using move buttons 670.

Figure 7:
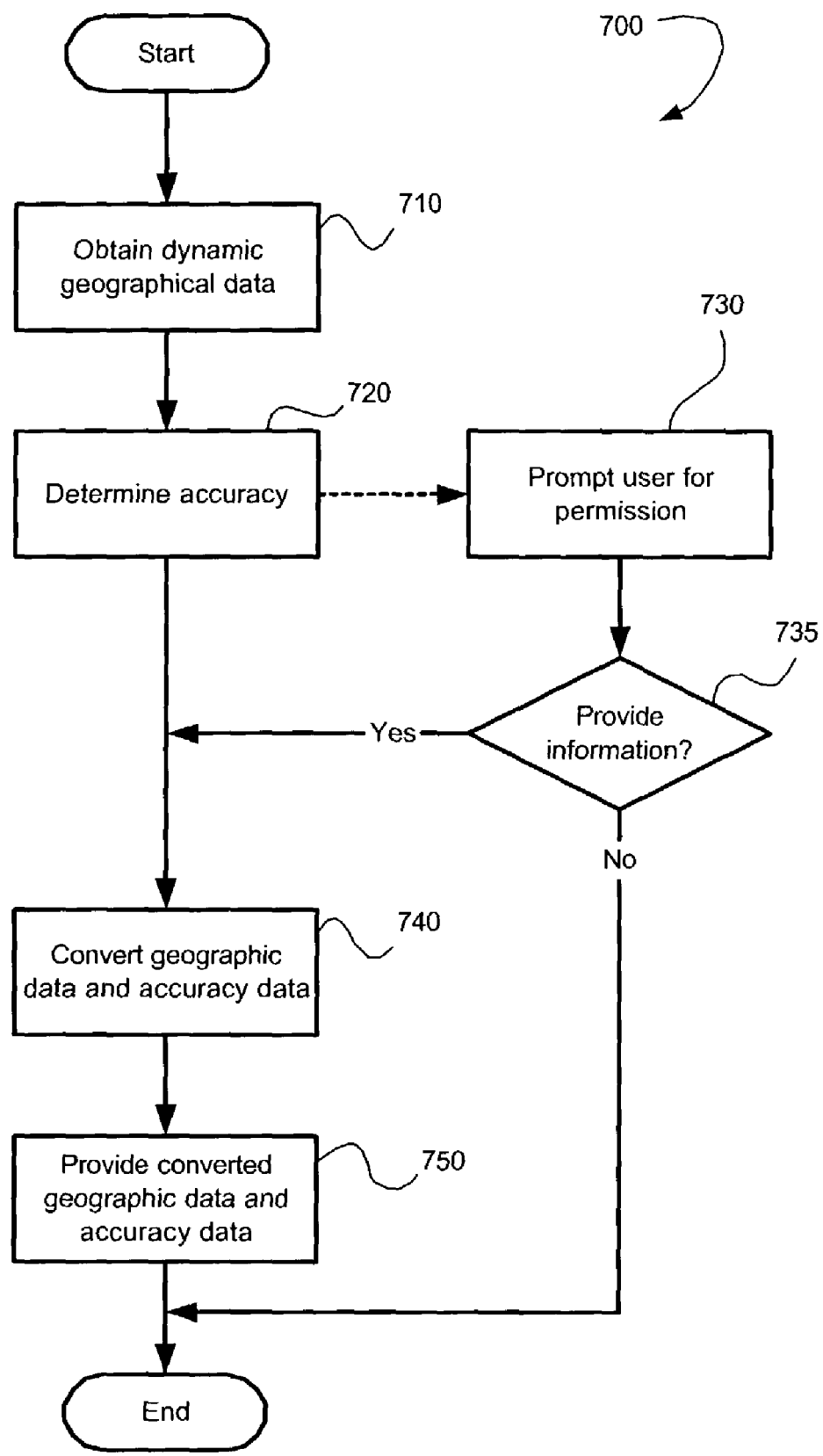
FIG. 7 is an operational flow diagram that shows an exemplary process for providing dynamic geographic data related to the geographic location of a computing device.

FIG. 7 is an operational flow diagram that shows an exemplary process 700 for providing dynamic geographic data related to the geographic location of a computing device. Process 700 may be used by a location engine to provide geographic data to location aware applications executing in the computing device.

Process 700 may be repeated at a predetermined interval for providing updated geographic data to the location aware applications. The process may be applied to obtain data from multiple location providers. For illustrative purpose, process for obtaining data from only one location provider will be shown. The process begins where a location engine has determined to obtain data from a location provider.

Moving from a start block, process 700 moves to block 710 where dynamic geographic data that identify the geographic location of the computing device are obtained from a location provider.

Process 700 continues at block 720 where the accuracy of the dynamic geographic data is determined. The location provider may provide the accuracy to the location engine. If the accuracy is not provided, the location engine may calculate the accuracy from other data obtained from the location provider or from other sources. At this point, the process 700 may continue to block 740. The location engine may not be configured to provide security or may have already determined and implemented the proper level of security.

Optionally, the process could proceed to block 730 where the user is prompted for permission to provide the dynamic geographic data to the applications.

The location engine may allow the user to apply the permission selection to all location aware applications that may receive dynamic geographic data from the location engine. The location engine may also allow the user to apply the permission selection only to a specific location aware application. The process then moves to block 735 where a determination whether permission is given to provide geographic data is determined. If the user does not give permission to provide geographic data, process 700 ends. If permission is given in this case, process continues at block 740.

From block 720 or from optional block 735, the process continues at block 740 where the process converts the dynamic geographic data and the associated accuracy data received from the location provider to a common format that is recognized by location aware applications executing on computing device. In this common format, the converted dynamic geographic data and accuracy data are recognized by the location aware applications even if the applications do not have specific knowledge about the location provider. Process 700 goes to 750. At block 750, the converted geographic data and accuracy data are provided to the location aware applications. Process 700 then ends.

Figure 8:
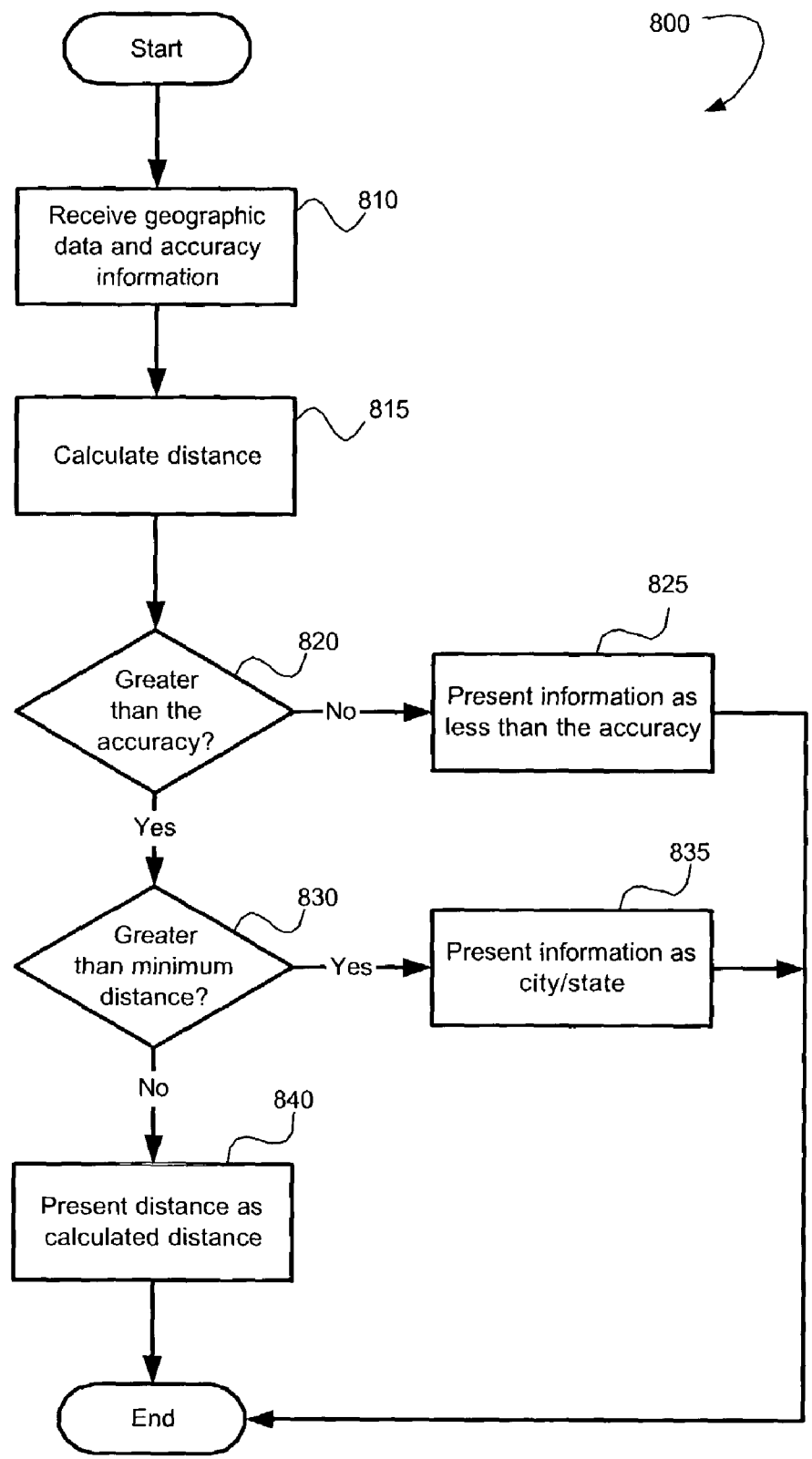
FIG. 8 is an operational flow diagram that shows an exemplary process for providing location information to the user.

FIG. 8 is an operational flow diagram that shows an exemplary process 800 for providing location information to the user. Process 800 may be used by a location-aware application to provide to the user location information of remote parties to whom the user communicates. In one embodiment, process 800 is used by an instant messaging application to display location information of the remote parties with whom the user exchanges instant messages. For illustrative purposes, the process is described as used by an instant messaging application for communicating with a particular remote party. The process begins when the instant messaging application is executing in a computing device and remote parties are communicating with the computing device.

Moving from a start block, the process continues at block 810 where dynamic geographic data of the user and the remote party is received. Accuracy information related to the dynamic geographic data may also be received. Process 800 continues at block 815. At block 815, the distance between the user and the remote party is calculated using the dynamic geographic data. The process then moves to block 820.

At block 820, a determination is made whether the calculated distance is greater than the accuracy of the dynamic geographic data that are used to calculate the distance. This determination allows the instant messaging application to ascertain how to present location information that is meaningful to the user. For example, if the calculated distance is not greater than the accuracy, it would not be meaningful for the user to know the calculated distance. In this case, the calculated distance is misleading because the error of the value is greater than value. Process 800 goes to block 825 where the location information is presented by the instant messaging application as less than the accuracy. Then, process 800 ends.

Returning to decision block 820, if the calculated distance is greater than the accuracy, process 800 continues at decision block 830 where a determination is made whether the calculated distance is greater than a predetermined minimum distance. This determination also enables the instant messaging application to ascertain how to meaningfully present the location information to the user. For example, if the distance is greater than the diameter of the city where the user is located, it is probably not very helpful for the user to know the distance between the user and the remote party. In this case, the user may be more interested in knowing where the remote party is located, not how far the remote party is from the user. If the calculated distance is greater than the predetermined minimum distance, process 800 continues at block 835 where the location information is presented by the instant messaging application as the city and state of where the remote party is located. Then, process 800 ends.

Returning to decision block 840, if the calculated distance is not greater than the predetermined minimum distance, process 800 continues at block 840 where the calculated distance is presented by the instant messaging application. Then, the process ends.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing relative geographic data to an instant text messaging application executing on a user computing device, the method comprising:
   obtaining user geographic data from a location provider of the user computing device, wherein the user geographic data identifies the location of the user computing device;
   obtaining remote geographic data of a remote computing device, wherein the remote geographic data identifies the location of the remote computing device;
   determining relative geographic data, wherein the relative geographic data includes information associated with the geographic location of the remote computing device in relation to the geographic location of the user computing device;
   associating the relative geographic data with the instant text messaging application, wherein the instant text messaging application is configured to send text messages to the remote computing device and receive text messages from the remote computing device;
   displaying a user interface for the instant text messaging application, wherein the user interface includes an online status for at least one contact name of the remote computing device, wherein the relative geographic data is displayed in the user interface in association with the at least one contact name, wherein displaying the relative geographic data in the user interface in association with the at least one contact name includes:
      displaying a calculated distance between the user computing device and the remote computing device when the calculated distance is less than a predetermined distance threshold, and
      displaying a city name associated with the location of the remote computing device when the calculated distance is greater than the predetermined distance threshold.

2. The computer-implemented method of claim 1, further comprising:
   determining an accuracy associated with the relative geographic data; and
   providing the accuracy to the instant text messaging application.

3. The computer-implemented method of claim 1, wherein providing the relative geographic data further comprises:

determining whether the instant text messaging application has permission to receive the user geographic data; and if the instant text messaging application has permission, providing the user geographic data to the instant text messaging application.

4. The computer-implemented method of claim 3, wherein determining whether the instant text messaging application has permission to receive the user geographic data further comprises prompting a user for the permission.

5. The computer-implemented method of claim 1, wherein the user computing device is a personal computer.

6. The computer-implemented method of claim 1, wherein the user computing device is a mobile communication device.

7. The computer-implemented method of claim 1, wherein the location provider is a component of the user computing device.

8. The computer-implemented method of claim 1, wherein obtaining user geographic data further comprises selecting the one location provider from among a plurality of location providers.

9. The computer-implemented method of claim 8, wherein selecting the one location provider is performed based on priorities associated with the plurality of location providers.

10. The computer-implemented method of claim 1, further comprising sending, by the user computing device, user geographic data to the remote computing device.

11. The computer-implemented method of claim 1, wherein the user geographic data and the remote geographic date include a common format that is recognized by a plurality of applications.

12. The computer-implemented method of claim 11, wherein the plurality of applications recognize the user geographic data in the common format without possessing knowledge of the location provider.

13. A computer-implemented method for presenting information related to instant messaging to a user of a computing device comprising:
 determining at least one remote party capable of sending instant messages to the user;
 receiving geographic data associated with the remote party in an instant message, wherein the geographic data includes a geographic location of the remote party;
 determining geographic data associated with the user, wherein the geographic data includes a geographic location of the user;
 determining relative geographic data, wherein the relative geographic data includes information associated with the geographic location of the remote party in relation to the geographic location of the user;
 associating the relative geographic data with an instant text messaging application, wherein the instant text messaging application is configured to send text messages to the remote party and receive text messages from the remote party; and
 displaying a user interface for the instant text messaging application, wherein the user interface includes an online status for at least one contact name of the remote party, wherein the relative geographic data is displayed in the user interface in association with the at least one contact name.

14. The computer-implemented method of claim 13, wherein the geographic data associated with the user is dynamically provided by a location provider.

15. The computer-implemented method of claim 13, further comprising providing the geographic data associated with the user to the remote party.

16. The computer-implemented method of claim 13, further comprising:
 determining whether a permission exists for sending the geographic data associated with the user to the remote party;
 if permission is not found, not sending the geographic data associated with the user to the remote party.

17. The computer-implemented method of claim 16, wherein determining whether a permission exists includes determining whether the remote party is included in a location permission list.

18. The computer-implemented method of claim 13, further comprising:
 calculating the distance between the user and the remote party based on the geographic data associated with the remote party and the geographic data associated with the user;
 determining an accuracy of the geographic data associated with the computing device; and
 if the calculated distance is less than the determined accuracy,
 presenting to the user that the distance between the remote party and the user is less than the value of the accuracy.

19. A computing device for providing information to a user comprising:
 a processor;
 a location provider for generating dynamic geographic data associated with the geographic location of the user;
 a network interface for data communication through a network, and
 a memory into which an instant text messaging application is loaded, wherein the instant text messaging application is configured to send text messages to the remote party and receive text messages from the remote party, wherein the instant text messaging application is configured to:
  generate a user-interface for selecting at least one remote party to provide access to geographic data associated with the location of the user;
  transmit to the at least one remote party the geographic data associated with the location of the user, when access to the geographic data is provided;
  receive, in an instant message, geographic data associated with the at least one remote party, wherein the geographic data includes a geographic location of the at least one remote party;
  obtain the dynamic geographic data associated with the user from the location provider, the dynamic geographic data includes a geographic location of the user;
  calculate the accuracy of the geographic location of the user and the geographic location of the at least one remote party;
  determine relative geographic data, wherein the relative geographic data includes information associated with the geographic location of the at least one remote party in relation to the geographic location of the user; and
  display, on the user interface, an online status for at least one contact name of the remote party, wherein the relative geographic data is displayed in the user interface in association with the at least one contact name.

20. The computing device of claim 19, wherein the instant text messaging application includes a mapping application, wherein selection of the at least one contact name presents a menu for causing the mapping application to display and populate with the relative geographic data.

21. The computing device of claim 19, wherein the instant text messaging application includes a driving direction application, wherein selection of the at least one contact name presents a menu for causing the driving application to present instructions for traveling between the location of the user and the location of the at least one remote party.

22. The computing device of claim 19, wherein the instant text messaging application includes a browser application, wherein selection of the at least one contact name presents a menu for causing the browser application to present network information associated with the relative geographic location.

23. The computing device of claim 19, wherein the computing device is a personal computer.

24. The computing device of claim 19, wherein the computing device is a mobile communication device.

25. The computing device of claim 24, wherein the mobile communication device is configured to communicate with a wireless telephone network.

26. The computing device of claim 19, further comprising a plurality of location providers for generating dynamic geographic data associated with the geographic location of the user.

27. The computing device of claim 26, wherein at least one of the location providers is a component of the computing device.

28. The computing device of claim 26, wherein the plurality of location providers include, a GPS device.

29. The computing device of claim 26, wherein the plurality of location providers include a cellular device.

30. The computing device of claim 26, wherein the plurality of location providers include a network location device.

31. The computing device of claim 1, wherein the instant text messaging application includes a mapping application, wherein selection of the at least one contact name presents a menu for causing the mapping application to display and populate with the relative geographic data.

32. The computing device of claim 1, wherein the instant text messaging application includes a driving direction application, wherein selection of the at least one contact name presents a menu for causing the driving application to present instructions for traveling between the location of the user computing device and the location of the remote computing device.

33. The computing device of claim 1, wherein the instant text messaging application includes a browser application, wherein selection of the at least one contact name presents a menu for causing the browser application to present network information associated with the relative geographic location.

* * * * *

UNITED STATES PATENT AND TRADEMARK OFFICE
CERTIFICATE OF CORRECTION

| | |
|---|---|
| PATENT NO. | : 7,383,316 B2 |
| APPLICATION NO. | : 10/295303 |
| DATED | : June 3, 2008 |
| INVENTOR(S) | : Zeke Koch et al. |

Page 1 of 1

It is certified that error appears in the above-identified patent and that said Letters Patent is hereby corrected as shown below:

In column 14, line 5, in Claim 28, delete "include," and insert -- include --, therefor.

Signed and Sealed this
Nineteenth Day of April, 2011

David J. Kappos
*Director of the United States Patent and Trademark Office*